United States Patent [19]
Starkweather et al.

[11] Patent Number: 6,031,448
[45] Date of Patent: Feb. 29, 2000

[54] MODULAR POSITION SENSOR

[75] Inventors: Michael W. Starkweather, Granger, Ind.; Robert F. Oldenburg, Constantine, Mich.

[73] Assignee: CTS Corporation, Elkhart, Ind.

[21] Appl. No.: 09/245,233

[22] Filed: Feb. 5, 1999

[51] Int. Cl.[7] .................................................. H01C 10/30
[52] U.S. Cl. ..................... 338/106; 338/162; 338/220; 338/221
[58] Field of Search ................................... 338/160, 162, 338/220, 221, 199, 164, 200

[56] References Cited

U.S. PATENT DOCUMENTS

| | | |
|---|---|---|
| 3,643,198 | 2/1972 | Economu . |
| 4,334,352 | 6/1982 | VanBenthuysen . |
| 4,430,634 | 2/1984 | Hufford et al. .......................... 338/164 |
| 4,435,691 | 3/1984 | Ginn . |
| 4,616,504 | 10/1986 | Overcash et al. . |
| 4,688,420 | 8/1987 | Minagawa . |
| 4,703,649 | 11/1987 | Eitoku et al. . |
| 5,039,975 | 8/1991 | Ishihara . |
| 5,133,321 | 7/1992 | Hering et al. . |
| 5,321,980 | 6/1994 | Hering et al. . |
| 5,385,068 | 1/1995 | White et al. . |
| 5,415,144 | 5/1995 | Hardin et al. . |
| 5,416,295 | 5/1995 | White et al. . |
| 5,460,035 | 10/1995 | Pfaffenberger . |
| 5,828,290 | 10/1998 | Buss et al. .............................. 338/162 |

*Primary Examiner*—Michael L. Gellner
*Assistant Examiner*—Richard K. Lee
*Attorney, Agent, or Firm*—Schmeiser, Olsen & Watts

[57] ABSTRACT

A position sensor, in particular, a modular position sensor for easy coupling to another modular device, like a gas pedal of a vehicle. The sensor eliminates the use of permanently attached electrical leads or pins attached to, for example, the output pads on flexible film coupled to a rotor. The sensor is provided with a housing wall having slots therein, conductive elements, a flexible film, and a pressure wall. In the preferred embodiment, the sensor is mounted on an external device having pins or electrical leads. The pins protrude through the slots in the housing wall and the contact conductive elements that are in direct contact with the output pads on the flexible film.

18 Claims, 4 Drawing Sheets

MODULAR POSITION SENSOR

This application is related to U.S. Pat. No. 5,828,290, herein incorporated by reference.

BACKGROUND OF THE INVENTION

1. Field of the Invention

This invention relates to position sensors. In particular, this invention relates to a position sensor that has a modular design for easy coupling to another modular device.

2. Description of Related Art

Various devices and methods of dealing with the design of position sensors are legion. Examples of patents related to the present invention are as follows, and each patent is herein incorporated by reference for the supporting teachings:

U.S. Pat. No. 5,828,290 is a modular position sensor with pin holes in the bottom thereof;

U.S. Pat. No. 5,460,035 is a bearing-free spring-free throttle position sensor;

U.S. Pat. No. 5,416,295 is a combined pedal force switch and position sensor;

U.S. Pat. No. 5,385,068 is an electronic accelerator pedal assembly with pedal force sensor;

U.S. Pat. No. 5,321,980 is an integrated throttle position sensor with independent position validation sensor;

U.S. Pat. No. 5,133,321 is an integrated throttle control and idle validation sensor;

U.S. Pat. No. 4,688,420 is a throttle valve position detecting device for a vehicle engine;

U.S. Pat. No. 4,430,634 is a rotary potentiometer with molded terminal package;

U.S. Pat. No. 4,616,504 is a throttle position sensor with a potentiometer module that fits into a connector casing; and The foregoing patents reflect the state of the art, of which the applicants are aware, and are tendered with the view toward discharging applicants' acknowledged duty of candor in disclosing information that may be pertinent in the examination of this application. It is respectfully stipulated, however, that none of these patents teach or render obvious, singly, or when considered in combination, the applicants' claimed invention.

3. Problems with Related Art

There are several common problems occurring with the related art. For example, a problem with previous modular designs is the scratching of the flexible film potentiometer that is positioned within the sensor housing. This occurs when the film is brought in direct contact with the pins or electrical leads that are disposed on the external device to which the sensor unit is coupled. In one previous design, the external device's pins penetrate the sensor housing through holes disposed in the base thereof. Once inside the sensor housing, the pins are brought in direct contact with output pads positioned along the flexible film. Such contact causes scratching of the output pads and, accordingly, potentially causing degraded performance of the sensor device.

FIGS. 1 and 2 show one example of such a related art sensor device. As shown, sensor unit 100 is provided with holes 117 in the base 139 thereof, a pressure wall 138 affixed to base 139, pressure wedges 136, and flexible film 130 having output pads 132 thereon. Pressure wedges 136 force flexible film 130 away from pressure wall 138 so that when sensor unit 100 is slid over an external device (not shown), pins 122, positioned on the external device, will protrude through holes 117 and directly contact output pads 132. However, the sliding of pins 122 against output pads 132 causes scratching to output pads 132 and, accordingly, degraded sensor unit 100 performance.

An additional problem with previous sensor devices is that it can be more expensive to make all of the variations for connecting the same sensor unit to different devices. In particular, a sensor unit may need a female connection, a male connection, a pig tail connection, or connections that are angled, etc. It is expensive to build a different assembly line for every type of connector that is integrally attached to the same sensor unit. It would be less expensive to have one assembly line to make all sensor units and test them, and have other standard assembly lines that produce the various types of connectors for mounting the sensor unit thereto. Therefore, there is a need for a modular sensor unit that can be attached to either a modular connector or another device, such as a gas pedal.

Another problem with the prior art is that it is more expensive to build sensor units with metal leads or pins that are permanently attached to the signal traces or output pads that are usually located on flexible films. The elimination of the permanent metal leads or pins from a modular sensor could lower the cost of making the sensor units. Therefore, there is a need for a less expensive sensor unit that can eliminate the use of permanently attached electrical leads or pins attached to, for example, the output pads on flexible films.

The preferred embodiment of the invention is designed to solve the problems herein described and other problems not discussed, which are discoverable by a skilled artisan.

SUMMARY OF THE INVENTION

It is a feature of the present invention to provide a position sensor unit. In particular, there is a position sensor that has a modular design for easy coupling to an external modular device, such as a gas pedal of a vehicle, to avoid direct contact between the internal flexible film and the electrical leads of the external modular device to eliminate scratching of the sensor unit's internal flexible film.

Yet, another feature of the invention is to provide a modular sensor unit that can be coupled directly to another device without the use of an intermediate connector unit.

Still, other features of the invention are to provide a position sensor unit where the sensor unit includes a housing having: 1) a top side or cover having a hole therein; 2) a bottom side or base; 3) a pressure wall, affixed to the base, having a first and a second side; 4) a housing wall, positioned between the top and bottom sides and surrounding the base, having a plurality of slots or grooves; 5) a flexible film having output pads thereon, positioned within the housing so that the pads are located between the first side of the pressure wall and the housing wall, and a remainder of the flexible film positioned adjacent the housing wall located on the second side; and 6) several conductive elements, located in the sensor unit, positioned between the flexible film and the slots in the housing wall. The conductive elements transmit signals from the flexible film to external pins or electrical leads and in so doing, prevent scratching of the flexible film by avoiding direct contact between the flexible film and the external pins or electrical leads.

The invention resides not in any one of these features per se, but rather in the particular combination of all of them herein disclosed and claimed. Those skilled in the art will appreciate that the conception, upon which this disclosure is based, may readily be utilized as a basis for the designing of other structures, methods and systems for carrying out the several purposes of the present invention. Further, the abstract is neither intended to define the invention of the application, which is measured by the claims, nor is it intended to be limiting as to the scope of the invention in any way.

Figure 1:
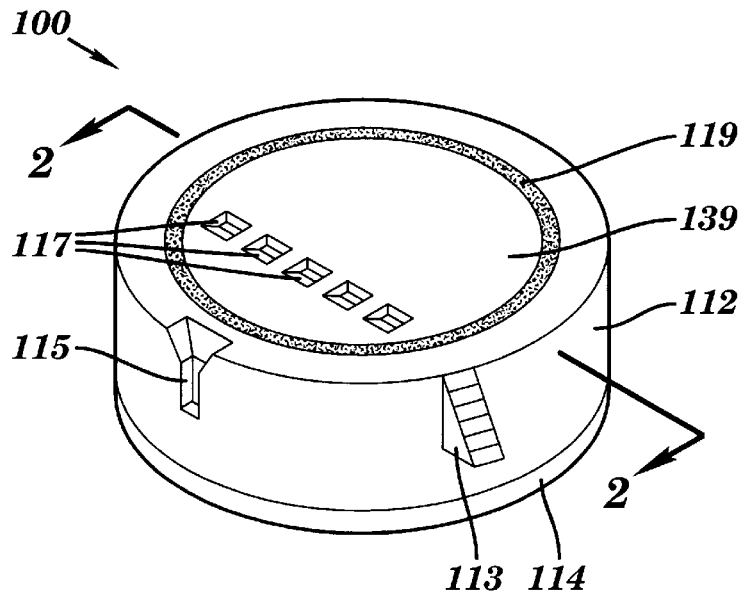
FIG. 1 is an isometric view of a related art sensor unit.
Figure 2:
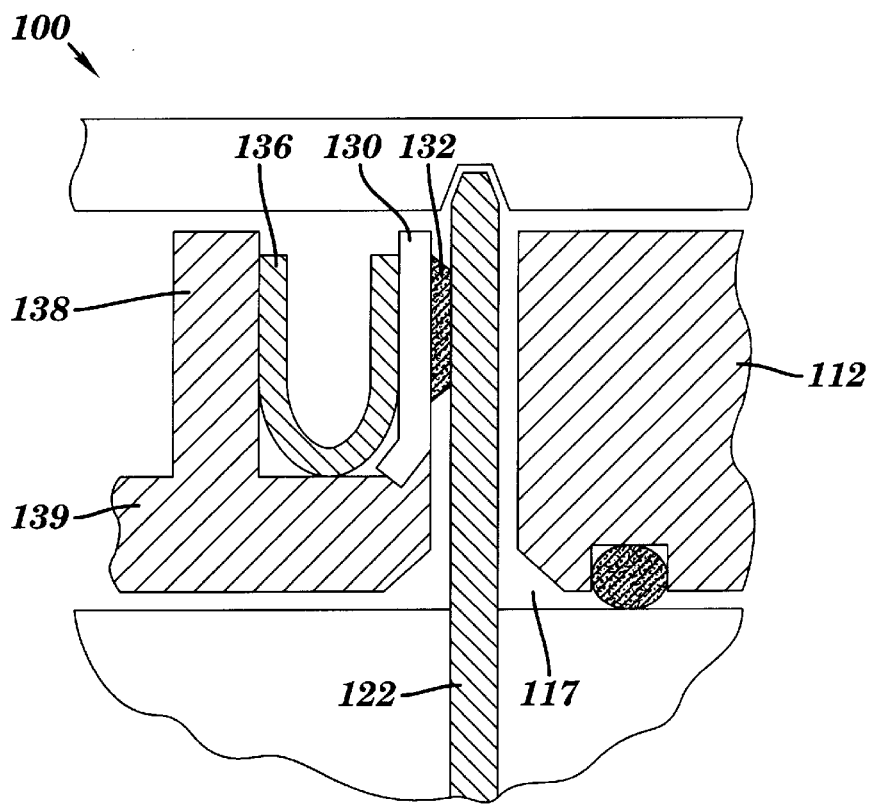
FIG. 2 is an inverted cross sectional view taken along lines 2—2 of the sensor unit of FIG. 1.

It is noted that the drawings of the invention are not to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements between the drawings.

DETAILED DESCRIPTION OF THE PREFERRED EMBODIMENT

Figure 3:
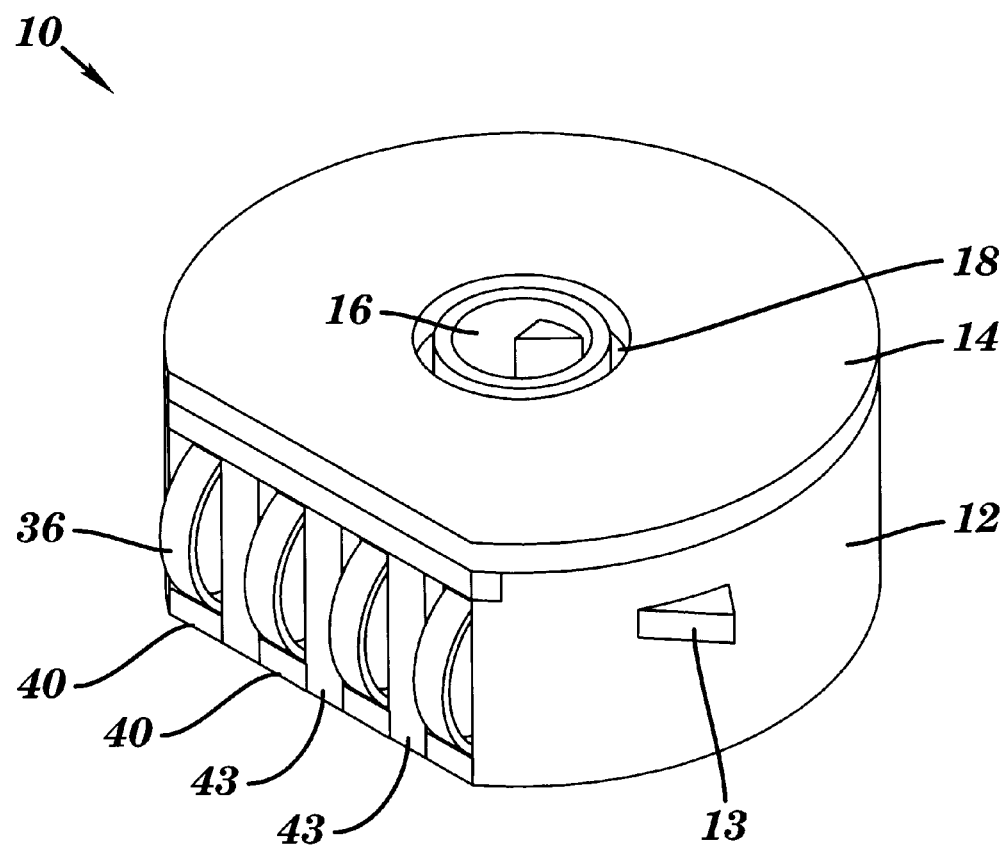
FIG. 3 is a perspective drawing of the modular sensor unit of the present invention.
Figure 4:
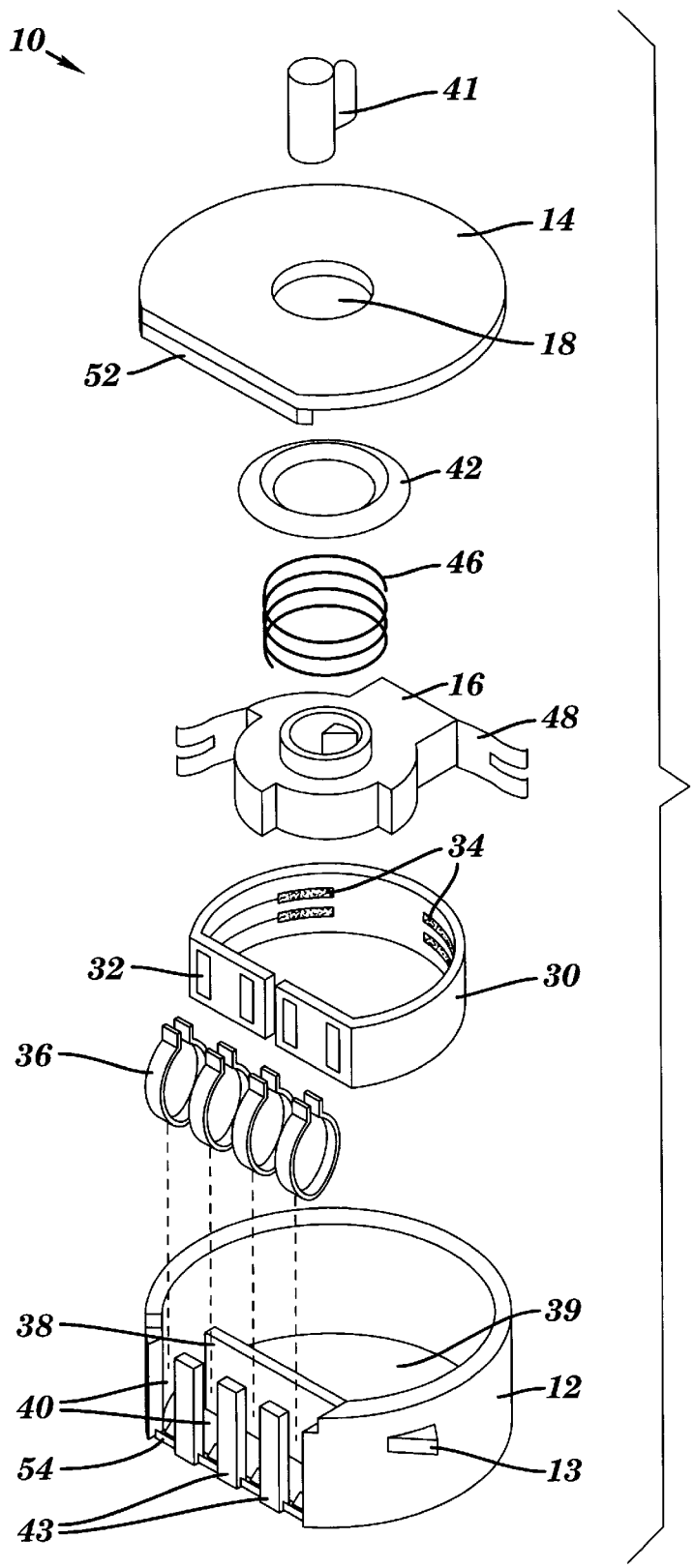
FIG. 4 is an exploded perspective view of the sensor unit of FIG. 3.
Figure 5:
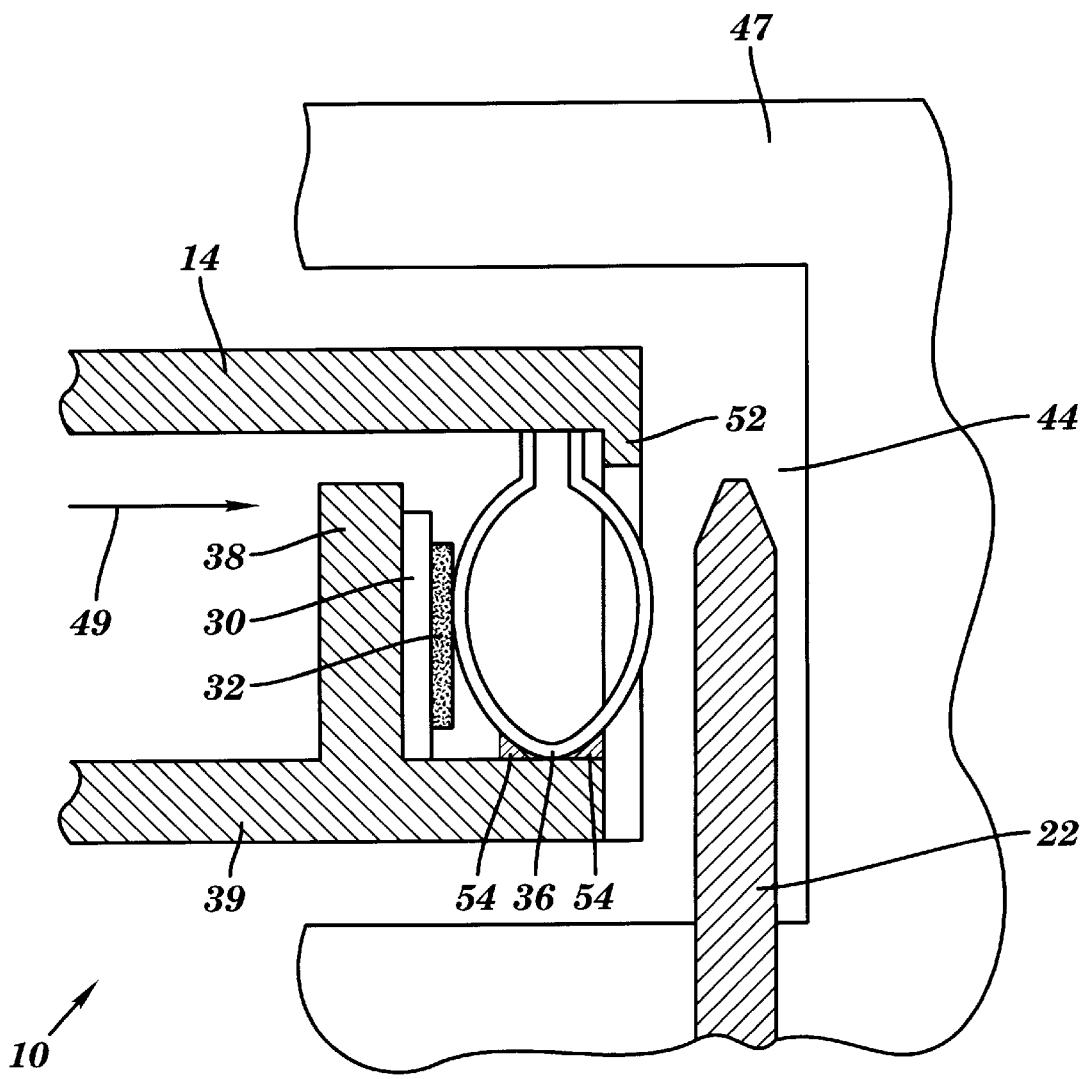
FIG. 5 is a cross sectional view of the sensor unit of FIG. 3 coupled to an external device.

The present invention provides a position sensor. In particular, there is a position sensor that has a modular design for easy coupling to an external modular device, such as a vehicle gas pedal. FIGS. 3–5 show the preferred embodiment of sensor unit 10 of the present invention. In particular, sensor unit 10 includes a housing wall 12, a latching tab 13, a cover 14 forming a top side of the sensor unit 10, a rotor 16, and a hole 18. Flexible film 30 is disposed so that the portion having output pads 32 thereon is positioned against a first side of pressure wall 38 that is affixed to base 39. The flexible film 30 has resistors 34 mounted thereon. Metal conductive elements 36 are positioned in slots 40 between posts 43 to make direct contact with output pads 32 while protruding through slots 40 in housing wall 12. Lip 52 and protrusion 54 help to position and retain conductive elements 36.

When sensor unit 10 is mounted in cavity 44 of external device 47, pins or electrical leads 22 will directly contact conductive elements 36 that are protruding through slots 40 of housing wall 12. Conductive elements 36, also in direct contact with output pads 32, will then transmit the signals received from output pads 32 of flexible film 30 to pins 22 of external device 47. Because there is no direct contact between output pads 32 and pins 22, the previous problems associated with output pad 32 scratching are eliminated. Although metal conductive elements 36 may be constructed from any number of metals, copper or aluminum is preferred. Additionally, a skilled artisan would realize that the metal conductive elements 36 must be single units to provide a proper electrical connection. In the absence of individual conductive elements 36, short circuiting would occur.

FIGS. 4 and 5, show the interrelationship between sensor unit 10 and external device 47 in greater detail. Referring first to FIG. 4, there are illustrated the internal components of the sensor unit 10. Specifically, sensor unit 10 additionally includes a seal 42, a spring 46, electrical contactor conductive wiper blades 48 on rotor 16, and resistance elements and/or traces 34 that are electrically coupled to pads 32. Moreover, there is illustrated a shaft 41 that is part of external device 47 that is to have its position determined by the sensor unit 10. The shaft 41 is shaped to securely fit through hole 18 and into rotor 16. Specifically, when sensor unit 10 is coupled to external device 47, shaft 41 engages rotor 16, which controls the contact between conductive wiper blades 48 and resistors 34.

An enlarged sectional view of sensor unit 10 mounted on external device 47, is shown in FIG. 5. As depicted, sensor unit 10 is inserted into cavity 44 of external device 47 in the direction shown by arrow 46. Male pin 22, fixed to external device 47, remains stationary as sensor unit 10 is moved into cavity 44. As sensor unit 10 is inserted into cavity 44, conductive elements 36, protruding through slots 40 and retained by lip 52 and protrusions 54, will directly contact pins 22. As the engagement of shaft 41 with rotor 16 causes conductive wiper blades to 48 contact resistors 34, signals are transmitted from traces 34 to output pads 32. The signals from output pads 32 are then transmitted through conductive elements 36 and received by pins 22 of external device 47. The latching tabs 13 hold sensor unit 10 to external device 47.

Although the disclosure of the preferred embodiment shows a specific number of output pads 32, slots 44 and conductive elements 36, it should be appreciated that the number and configuration of these components may vary. For example, a sensor may be constructed with more or less conductive elements 36, output pads 32 and slots 40.

Although latching tab 13 is shown for securely affixing sensor unit 10 to external device 47, it should be appreciated that many such means are apparent to one of ordinary skill in the art. For example, an artisan could utilize a snap-fit or similar male-female attachment means such as a pressure fit pin design.

Even though the preferred embodiment shows a pressure wall 38, artisans could use most any structure that would support pressure to be applied to conductive elements 36, which can also be most any shape and still force film 30 against conductive elements 36.

Although the illustrated embodiments discuss the arrangement of a sensor using connector unit, one skilled in the art will realize that the preferred embodiment would work with most any device that provides male electrical leads or pins 22 to fit against the sensor unit 10.

An additional variation of the invention contemplates the use of applying any type base material 39 to support the resistive elements and/or traces 34, for example any suitable metal, Kapton material, polyamide material, plastic, etc. Although the preferred embodiment depicts a certain shaped film 30, many variations are possible. For example, all of the outputs could be at one end of the film 30, and the slit separating the two ends could be positioned in another location.

It is contemplated to position the flexible film 30 with the conductive elements 36 therebehind so that the output pads 32 will come into direct contact with the pins 22. Since the sensor unit 10 is moved into position along line 49, potential scratching of the output pads 32 is eliminated. Slots 40 allow for the pins 22 to press against the output pads 32 instead of scraping along the output pads 32 when coupling the sensor unit 10 thereto.

While the invention has been taught with specific reference to these embodiments, someone skilled in the art will recognize that changes can be made in form and detail without departing from the spirit and the scope of the invention. The described embodiments are to be considered in all respects only as illustrative and not restrictive. The scope of the invention is, therefore, indicated by the appended claims rather than by the description. All changes that come within the meaning and range of equivalency of the claims are to be embraced within their scope.

We claim:

1. A sensor, comprising:
   a) a housing having:
      a1) a base
      a2) a pressure wall affixed to the base, wherein the pressure wall has a first and a second side, and
      a3) a housing wall surrounding the base, said housing wall having a slot therein;
   b) a conductive element, positioned between the first side of the pressure wall and the slot; and
   c) a flexible film having an output pad thereon and positioned within the housing so that the output pad is disposed between the conductive element and the first side of the pressure wall.

2. The sensor of claim 1, further comprising a housing cover having a hole therein.

3. The sensor of claim 2, wherein the conductive element is retained by a lip on the cover and a protrusion on the housing.

4. The sensor unit of claim 1, wherein the output pad is electrically coupled to a resistor.

5. The sensor of claim 2, further comprising a rotor having a contactor for contacting the flexible film, wherein the rotor is positioned to extend into and be exposed through the hole.

6. The sensor of claim 2, wherein the slot extends from the base to the cover.

7. A sensor, comprising:
   a) a cover;
   b) a base having a pressure wall affixed thereto, wherein the pressure wall has a first and a second side;
   c) a housing wall, wherein the housing wall includes at least one slot proximate the pressure wall;
   d) conductive elements, positioned between the slot of the housing wall and the pressure wall; and
   e) sensor means, including output pads, for generating an electrical signal, wherein the sensor means is positioned between the conductive elements and the pressure wall.

8. The sensor of claim 7, wherein the sensor means comprises a flexible film.

9. The sensor of claim 7, wherein the conductive elements are retained by a lip on the cover and a protrusion from the base.

10. The sensor of claim 7, wherein the output pads are electrically coupled to traces.

11. The sensor of claim 7, wherein the cover includes a hole.

12. The sensor of claim 11, further comprising a rotor having a contactor for contacting the flexible film, wherein the rotor is positioned to extend into and be exposed through the hole.

13. The sensor of claim 7, wherein the output pads directly contact the conductive elements.

14. The sensor of claim 13, further comprising signal receiving means, wherein the signal receiving means directly contacts the conductive elements through the slots in the housing wall.

15. A sensor, comprising:
   a) a housing
   b) means, located within the housing, for generating a signal including a flexible film having an output pad thereon; and
   c) means, located within the housing, for transmitting the signal including:
      i) a conductive element in direct contact with the output pads, and
      ii) a slot located in the wall of the housing for directly contacting the conductive element with external signal receiving means.

16. The sensor of claim 15, wherein the external signal receiving means comprises a pin.

17. The sensor of claim 15, wherein the conductive element is metal.

18. The sensor of claim 15, wherein the slot is positioned on the housing.

* * * * *